May 12, 1959 P. H. PETERS, JR., ET AL 2,886,786

BALUN-RIDGE CIRCUIT

Filed Aug. 1, 1957

Inventors:
Philip H. Peters Jr.,
Donald A. Wilbur,
by Paul A. Frank
Their Attorney.

United States Patent Office 2,886,786

Patented May 12, 1959

2,886,786

BALUN-RIDGE CIRCUIT

Philip H. Peters, Jr., Schenectady, and Donald A. Wilbur, Albany, N.Y., assignors to General Electric Company, a corporation of New York Application August 1, 1957, Serial No. 675,704

7 Claims. (Cl. 333—26)

The present invention relates to a balun-ridge circuit for converting an electrical signal from a balanced to an unbalanced condition or from an unbalanced condition to a balanced condition.

In high frequency applications it is often necessary to convert an electrical signal from a balanced to an unbalanced condition or vice versa. Devices or circuits for providing this conversion are termed "balun" circuits. The word "balun" is derived from the first few letters of the two words "balanced" and "unbalanced."

It is an object of the present invention to provide an improved small and rugged balun circuit.

Frequently in network applications in which a signal is converted from a balanced to an unbalanced condition or vice versa, the circuit producing the signal has a characteristic impedance different from that of the circuit receiving the signal. Because of this, it has often been necessary to include an impedance matching circuit. Of course, it would be most desirable to incorporate the impedance matching circuit as an integral part of the balun circuit that provides the balanced to unbalanced conversion.

Accordingly, another object of the present invention is the provision of a balun circuit that provides impedance matching.

One type of balanced to unbalanced conversion is required in the transition of a signal from a wave guide to a coaxial line. Previous balun circuits for providing this function have had a right angle bend between the input and output. In some applications this bend is objectionable because it hinders the compact network packaging. Also, in those circuits in which a high frequency device such as a magnetron is employed in the balun circuit, the bend often interferes with the magnet that is used with the magnetron.

Thus, a further object is to provide a balun circuit that is axially arranged.

In some applications a coaxial line is energized by oscillations from an interdigital magnetron. Because the output high frequency wave or signal from such a magnetron is balanced and because a coaxial line is capable of transmitting only an unbalanced signal, a circuit is required to convert the balanced output wave of the magnetron to an unbalanced input wave for the coaxial line.

Still another object of the present invention is to provide a balun circuit capable of converting the balanced output wave from an interdigital magnetron to an unbalanced input wave for a coaxial line.

Recently, voltage tunable interdigital magnetrons have been developed. Of course, such magnetrons require a circuit having a broad or "wide" band-pass characteristic for converting the balanced magnetron signals to unbalanced signals.

Still another object is to provide a wide band balun circuit.

In one embodiment of our invention, these objectives are obtained through the utilization of two connected coaxial ridged wave guide sections. One of these sections can be of conventional shape. But if it is used with an interdigital magnetron or any similar device having a pair of vane rings, this section is provided with a mounting cover that situates the device so that one vane ring is flush with the ridge of the wave guide and the other vane ring is flush with the wave guide side opposite the ridge. The other or second wave guide section has a tapered ridge that can be considered an extension of the ridge of the first section. This tapered ridge is tapered in width and thickness such that the tapered end of the ridge approaches the size of the center conductor of a coaxial line. The decrease of the capacitance in this second section due to the tapering of the ridge is compensated for by the inclusion of tapered side rails. The tapered end of the tapered ridge is joined to the center conuctor of a coaxial output connector whose outer conductor is joined to the outer wall of the second wave guide section. In the following paragraphs an explanation is presented as to how this structure provides the above-mentioned objects.

Although the specification concludes with claims particularly pointing out and distinctly claiming the subject matter that we regard as our invention, it is believed the invention will be better understood from the following description taken in connection with the accompanying drawing in which:

Figure 1:
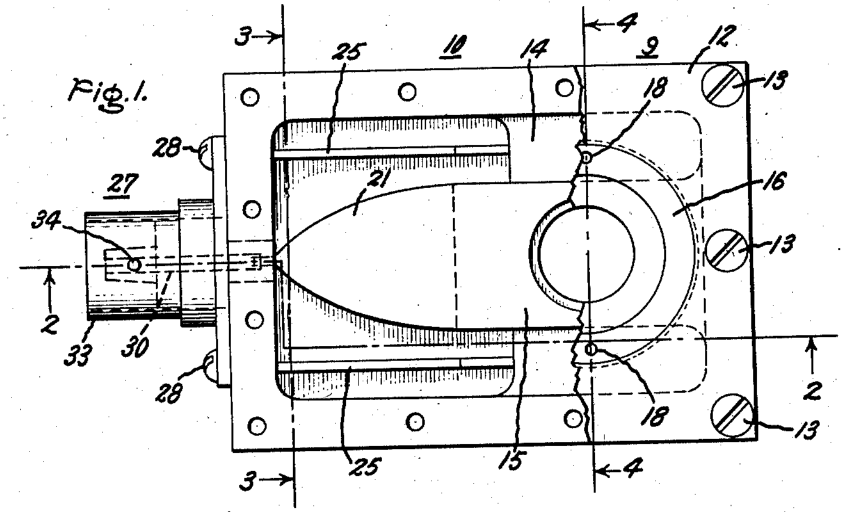
Fig. 1 is a top view, partly in section, of a preferred embodiment of our invention.

In the several figures of the drawing, corresponding elements have been indicated by corresponding reference numerals to facilitate comparison. Referring specifically to Fig. 1 there is shown a preferred embodiment of our balun circuit comprising a ridged wave guide region 9 and a transition region 10. In region 9 there is a rectangular-shaped cover 12—that also extends over region 10—mounted by a plurality of screws 13 to a channel-shaped body 14 having a ridge 15. Of course, cover 12 can be secured to body 14 by suitable means other than screws. Cover 12 and body 14 are designed for the mounting therein of an interdigital magnetron or other high frequency oscillating device having vane rings, such a device being shown in Fig. 5. In cover 12 means are provided for mounting a magnetron comprising a mounting ring 16 rotatably screwed into this cover by any suitable tool that can engage holes 18. One suitable tool is a spanner wrench. The particular means for mounting a magnetron is not critical as long as it maintains one of the magnetron vane rings flush with the ridge 15 and the other vane ring flush with the interior of the wave guide side opposite this ridge, and provides good radio frequency contact between the magnetron and its circuit.

The dimensions of region 9 are not critical. However, they should be such that the cutoff frequency for region 9 is no lower than the lowest frequency that can be transmitted by region 10 and the output circuit connected thereto. The calculation of such dimensions is well known to those skilled in the art and thus requires no discussion. If region 9 resonates at a frequency lower than that capable of being transmitted, the magnetron may oscillate at one of these lower frequencies. The resulting oscillatory energy is reflected reactively from region 10 back into region 9. This reflected reactive energy causes loss of tuning control of the tunable magnetron, if one is used with the circuit. That is, the magnetron may continue oscillating at this low frequency in spite of the operation of the tuning control away from this frequency.

In region 10 there is a tapered ridge 21 that is in electrical contact with ridge 15 of region 9. While ridges 15 and 21 are shown integral with body 14, they can be separate members if electrical contact is maintained between them. Ridge 21 is tapered not only in width, as shown in Fig. 1, but also in thickness (best seen in Fig. 2). Both the width and thickness tapers increase in a direction away from region 9. As the thickness taper increases along the length of region 10, an increasing space is created between the underside of ridge 21 and the floor of region 10. With this increase in space there is a corresponding increase in the cutoff frequency along the length of region 10. This cutoff frequency may increase to a value greater than the cutoff frequency of region 9 and thereby cause the reflection of reactive energy back into region 9. The result is not only a loss in transmission but also, as previously explained, a loss in control of a tunable magnetron, if one is employed. To avoid these results, means should be inserted to maintain a low and preferably constant cutoff frequency. In other words, means should be associated with region 10 for maintaining the electrical characteristics that otherwise would be absent due to the tapering of ridge 21. This means, as shown, comprises two tapered side rails 25 mounted on opposite sides of ridge 21. These side rails act to fold the wave guide on either side of ridge 21 and thereby sufficiently lower the cutoff frequency in region 10. While of course, the same effect could be obtained by tapering out the sides of region 10, this would lead to an unnecessary large device and, if a magnetron is used in the circuit, might in fact require the use of an unnecessarily large magnet with the magnetron.

A discussion of suitable dimensions for region 10 is presented below in one of the paragraphs relating to Fig. 2.

Located at an end of region 10 is a coaxial output connector 27 mounted by suitable means, such as, for example, screws 28. Connector 27 comprises a central conductor 30 electrically joined to the tapered end of ridge 21. An insulator plug 31 insulates central conductor 30 from an outer conductor 33 that is electrically connected to the outer wall of region 10. Pins 34 are provided on connector 27 to facilitate the connection of a coaxial line thereto.

Figure 2:
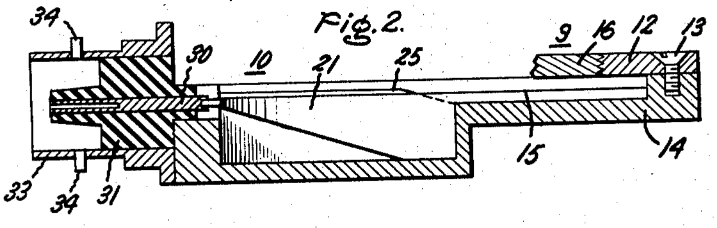
Fig. 2 is a side sectional view of the embodiment of Fig. 1 taken along the line 2—2.

In the cross-sectional illustration of Fig. 2 the thickness taper of ridge 21 is seen to be caused by an undercutting of this ridge over a part of its length. It is not essential that all of the thickness taper be on the underside as is shown. Rather, the top could be tapered toward the floor somewhat. This would merely require shifting the location of axial connector 27 in the end wall of region 10. However, it is preferred that all of the thickness taper be along the bottom because this bottom taper produces better impedance matching between region 9 and the coaxial line to be connected to connector 27. Impedance matching is important because in general the characteristic impedance of the ridge wave guide region 9 is much less than the input impedance of any coaxial line that will be connected to connector 27. The thickness taper of ridge 21 although shown to be linear can be curved. Likewise, the taper on the sides of this ridge can be linear instead of curved depending upon the transfer impedance characteristic desired.

Fig. 2 also shows that the tapering of the side rails 25 is only toward the rear of region 10. This tapering is not critical but there should be more of the side rails in the vicinity where there is a tapering of ridge 21 than where there is no tapering because the presence of the side rails compensates for the capacitance lost by the tapering of ridge 21.

From Fig. 2 it can be seen that region 10 has more depth than region 9. However, this depth is not critical. The other dimensions, that is the width and length, of this region are more critical. The width is critical because the cutoff frequency is related to the width, as previously mentioned. The length of region 10 is critical to the extent that it should be less than a wave length because in this region there are both wave guide and coaxial type modes existing simultaneously which interact with one another to create the existing field configuration. If the length of region 10 is in excess of one wave length at the highest frequency in the operating range, the two types of modes may not constructively interact with the result that the coupling provided by region 10 between region 9 and the coaxial line to be joined to connector 27 may change undesirably with frequency.

Figure 3:
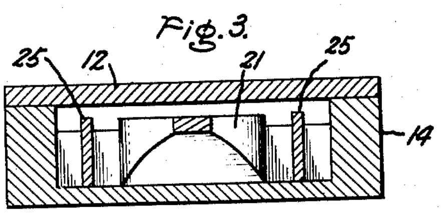
Fig. 3 is a front sectional view of the embodiment of Fig. 1 along the line 3—3.

Fig. 3 better illustrates the positioning and size of side rails 25. These rails extend from the floor of region 10 toward cover 12 but do not touch it. In effect, these rails act to increase the electrical width of the cavity in the transition region 10 and thereby suitably lower the cutoff frequency and also maintain it substantially constant.

Figure 4:
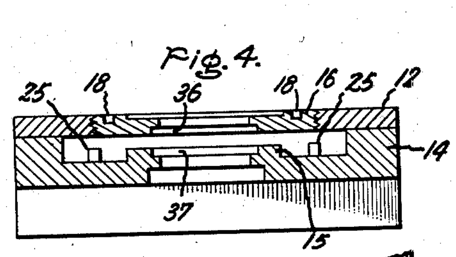
Fig. 4 is a back sectional view of the embodiment of Fig. 1 taken along the line 4—4.

Fig. 4 is provided to illustrate that there is a ring-shaped cavity 36 in the mounting cover 16 and a similar cavity 37 in the ridge 15 beneath this cover. As will be shown in Fig. 5, these ring-shaped cavities are needed for the seating of magnetron vane rings.

Figure 5:
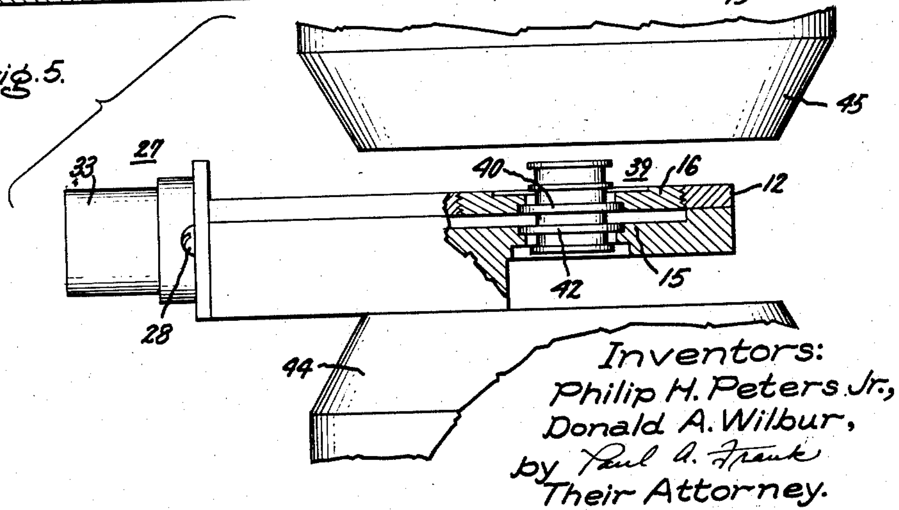
Fig. 5 is a side view, partly in section, of the embodiment of Fig. 1 within which there is mounted an interdigital magnetron that is situated between the poles of a magnet.

In Fig. 5 the device of Fig. 1 is shown with an interdigital magnetron 39 mounted therein. Magnetron 39 has two vane rings 40 and 42. Ring 40 is situated in ring-shaped cavity 36 such that the bottom of this vane ring is flush with the bottom of cover 16. Likewise, vane ring 42 is situated in ring cavity 37 such that the top of this vane ring is flush with the upper surface of ridge 15. The magnetic flux for magnetron 39 is obtained from a magnet having a lower pole 44 and an upper pole 45.

Basically, the balun ridge circuit of Figs. 1–5 operates as follows: an electric wave generated by the magnetron 39 travels down ridge wave guide region 9 with the associated magnetic field components located in a plane parallel to the top of this region. As this wave enters the transition region 10, some energy is coupled in opposite space phase to the undercut region below tapered ridge 21. An E-vector is thereby established between ridge 21 and the floor of region 10 as well as between this ridge and the underside of cover 16. The electric field in the undercut region increases toward the coaxial connector 27 until the net electric field distribution at the connector corresponds to that of a coaxial line. That is, E-vectors extend radially from the tapered tip of ridge 21 and the magnetic field encircles this tip. The transition from a wave guide mode to a coaxial line mode is thereby completed.

It should be evident from the above description that the present circuit has the stated advantages. The use of ridge wave guides, side rails, and other features have made this device very compact and rugged. To illustrate the small size of this device, one was built that had a width of 2 inches and a length of 2¾ inches. However, despite this small size it was successfully operated with a magnetron tunable over a range of 2.5 to 4.2 kilomegacycles at a power level above 1 watt. As previously mentioned, another advantage, that of impedance matching, is obtained through the undercutting of the ridge 21. This matching is important because the generator impedance of the magnetron 39 associated with the ridged wave guide region may be in the neighborhood of 15 ohms and a coaxial line joined to connector 27 may have an impedance of approximately 50 ohms. This fairly large difference in impedances (over 3:1) of course should be matched in order to provide efficient transmission of waves from magnetron 39 to the coaxial line. Another advantage, that of axial arrangement, is particularly evident from Fig. 5. If the circuit had a right angle bend with the magnetron 39 in one elbow of the bend and the connector 27 in the other elbow, special provision would have to be made to avoid physical interference between connector 27 and one of the pole pieces 44 or 45. There is no such difficulty with the axial arrangement of the present invention. Still another advantage is suitability not only for conversion of balanced signals to unbalanced signals and vice versa, regardless of the source of the signals, but also suitability for the conversion of the balanced output wave or signal from an interdigital magnetron to an unbalanced signal for a coaxial line. The interdigital magnetron 39 can be conveniently mounted in the ridged wave guide region 9 and of course a coaxial line can be joined to connector 27. A further advantage of the present circuit is a very low characteristic impedance. With a low characteristic impedance the circuit, of course, has a broad response curve, a feature especially desired when a voltage tunable magnetron is used in this circuit because then the magnetron can be tuned over a very wide range.

While the invention has been described with respect to certain specific embodiments, it will be appreciated that many modifications and changes may be made by those skilled in the art without departing from the spirit of the invention. We intend, therefore, by the appended claims, to cover all such modifications and changes as fall within the true spirit and scope of the invention.

What we claim as new and desire to secure by Letters Patent of the United States is:

1. A circuit for transforming the balanced output wave from a high frequency oscillating device to an unbalanced wave comprising a first wave guide region including a ridged wave guide with a single ridge, means for mounting said high frequency oscillating device in said ridged wave guide such that the balanced output from said device appears between the ridge and the wall of said ridged wave guide opposite said ridge, and a second wave guide region connected coaxially with said first wave guide region and including a ridge tapered in width and thickness that is in electrical contact with the ridge of said first wave guide region.

2. A coupling circuit for coupling a balanced circuit to an unbalanced circuit comprising a first ridged wave guide for connection to said balanced circuit, and a second ridged wave guide for connection to said unbalanced circuit, said second ridged wave guide having a ridge connected to a ridge of said first wave guide, wherein said ridge of said second wave guide is tapered in width and thickness and is supported by a wall of said second ridged wave guide.

3. The coupling circuit as defined in claim 2 wherein said tapered ridge is tapered in thickness so that at least a portion of said tapered ridge is physically separated from said supporting wall.

4. The coupling circuit as defined in claim 2 and means for maintaining a cutoff frequency along the length of said ridged wave guide at least as low as the cutoff frequency of said first ridged wave guide.

5. A circuit for transforming a balanced output wave from a high frequency voltage tunable oscillator to an unbalanced wave comprising a first wave guide having at least one ridge therein, means for mounting a voltage tunable oscillator in said first wave guide such that the electrical waves generated by said voltage tunable oscillator are propagated in said first wave guide, a second wave guide mounted to said first wave guide and having a ridge tapered in width and thickness that at one end is in electrical contact with a ridge of said first wave guide and that at another end is tapered to a small, approximately circular area, and means for maintaining the cutoff frequency along said second wave guide at least as low as the cutoff frequency of said first wave guide.

6. The circuit as defined in claim 5 wherein the length of said second wave guide is shorter than the wave length of the highest operating frequency of said voltage tunable oscillator.

7. A circuit for transforming the balanced output wave from two vane rings of a high frequency oscillating device, to an unbalanced wave suitable for energizing a coaxial line, said circuit comprising a first wave guide having a single ridge, means for mounting said high frequency oscillating device into said first wave guide such that one of said vane rings is flush with the single ridge and the other of said vane rings is flush with the wave guide wall opposite said ridge, a second wave guide having a tapered ridge with one end tapered in width and thickness and another end connected to the ridge of said first wave guide, said tapered ridge being shaped to transform electromagnetic energy from a wave guide mode to a coaxial mode, and a coaxial line output connector having a central conductor coaxially connected to the tapered end of said tapered ridge.

References Cited in the file of this patent

UNITED STATES PATENTS 2,724,090 Moore ---------------- Nov. 15, 1955

OTHER REFERENCES

Ragan (editor): Microwave Transmission Circuits, pages 57, 360 and 361, McGraw-Hill Book Co., New York, 1948. (Copy in Scientific Library).